Figure 5:
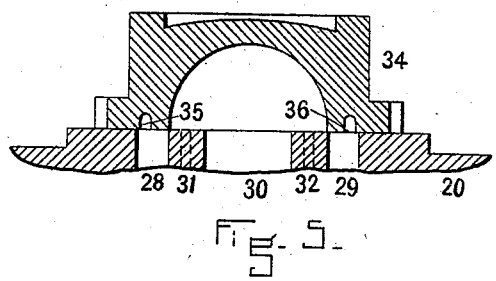

(No Model.) 7 Sheets—Sheet 1.
H. R. FAY.
ENGINE VALVE.
No. 494,194. Patented Mar. 28, 1893.
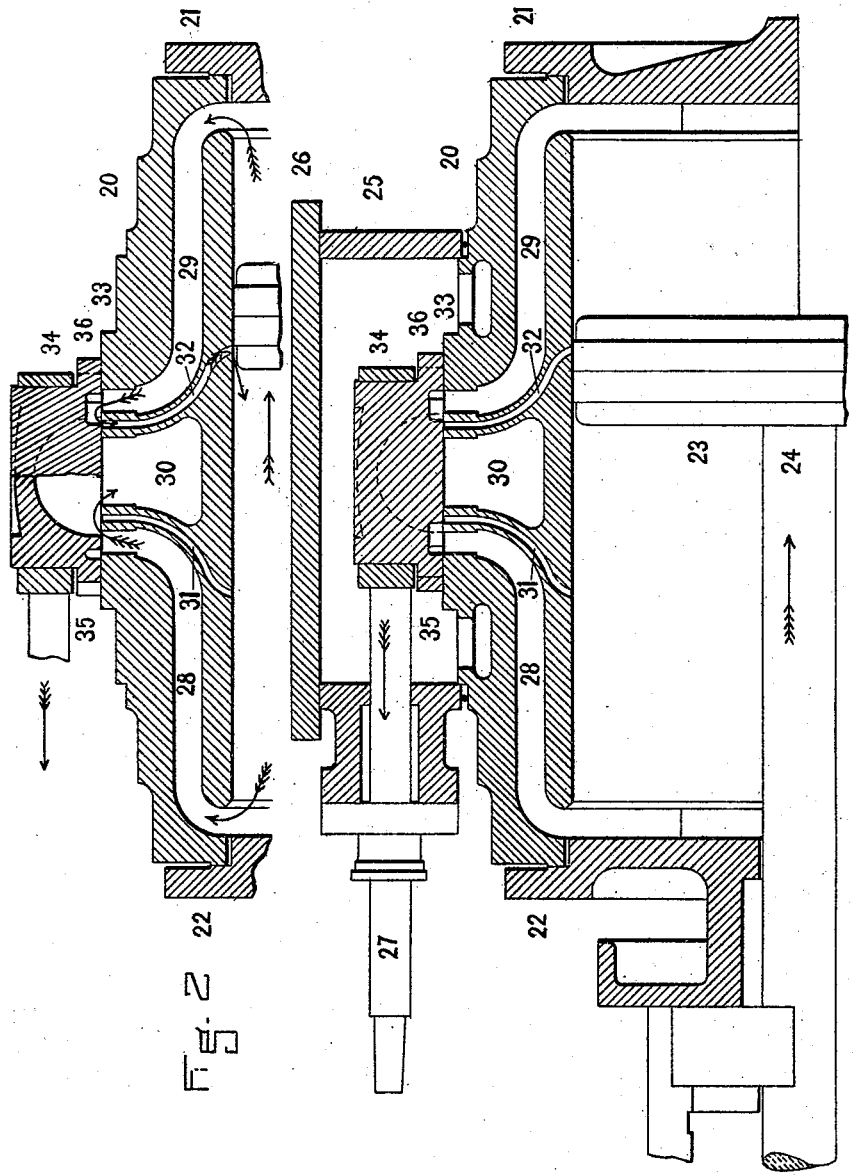
WITNESSES
Charles L. Ellis.
George L. Dolbeare.
INVENTOR
Henry R. Fay
BY
E. Frank Woodbury.
ATTORNEY.

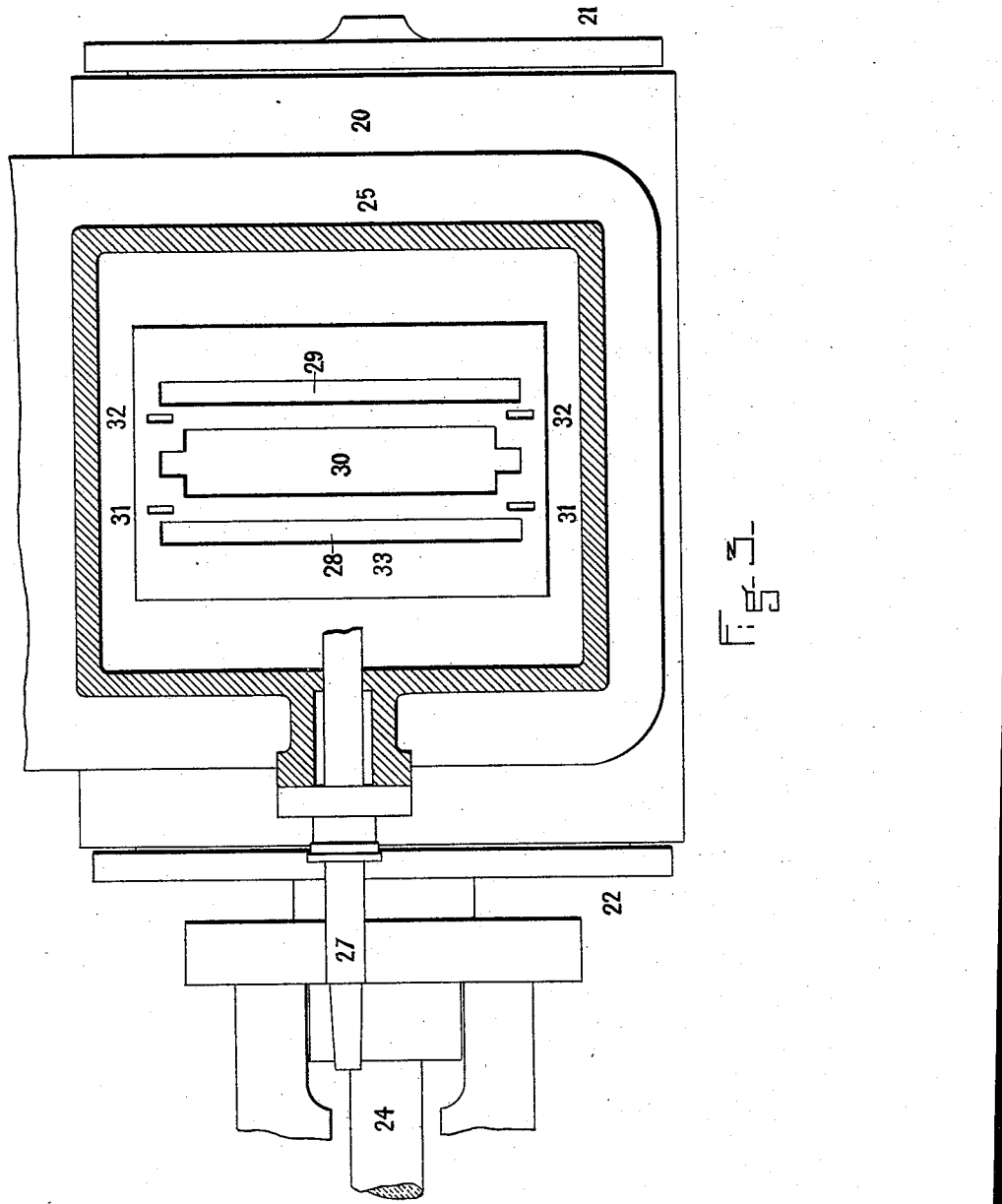

(No Model.)

H. R. FAY.
ENGINE VALVE.

No. 494,194.

7 Sheets—Sheet 3.

Patented Mar. 28, 1893.

WITNESSES.
Charles L. Ellis.
George L. Dolbear.

INVENTOR.
Henry R. Fay.
BY
E. Frank Woodbury,
ATTORNEY.

(No Model.) 7 Sheets—Sheet 4.

H. R. FAY.
ENGINE VALVE.

No. 494,194. Patented Mar. 28, 1893.

WITNESSES
Charles L. Ellis
George L. Dolbeare

INVENTOR
Henry R. Fay
BY E. Frank Woodbury
ATTORNEY (No Model.) 7 Sheets—Sheet 5.

H. R. FAY.
ENGINE VALVE.

No. 494,194. Patented Mar. 28, 1893.

WITNESSES
Charles L. Ellis.
George L. Dolbeare

INVENTOR
Henry R. Fay
BY E. Frank Woodbury,
ATTORNEY (No Model.) 7 Sheets—Sheet 6.

H. R. FAY.
ENGINE VALVE.

No. 494,194. Patented Mar. 28, 1893.

WITNESSES
Charles L. Ellis.
George L. Dolbeare.

INVENTOR
Henry R. Fay
BY E. Frank Woodbury
ATTORNEY

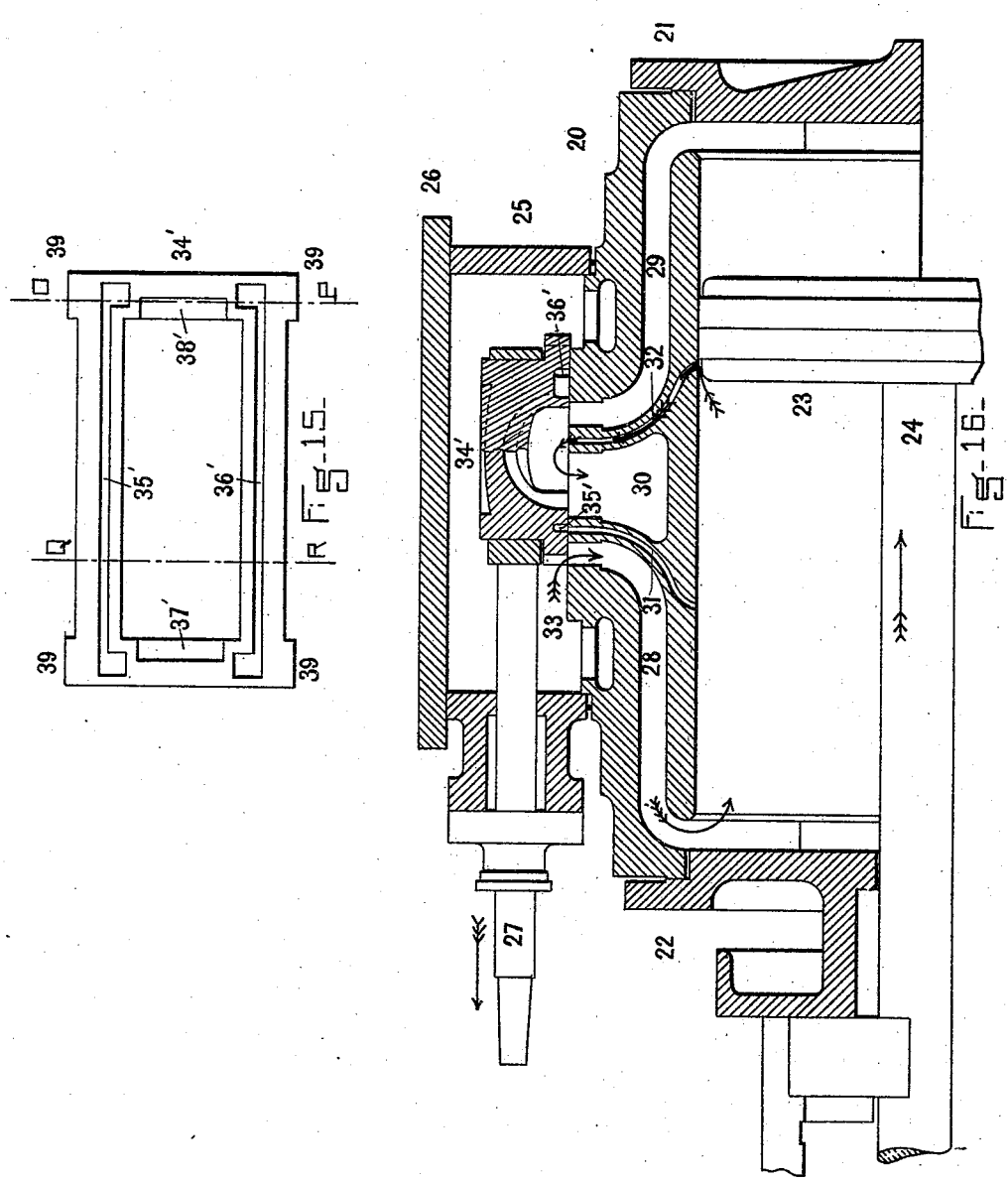

UNITED STATES PATENT OFFICE.

HENRY R. FAY, OF BOSTON, MASSACHUSETTS.

ENGINE-VALVE.

SPECIFICATION forming part of Letters Patent No. 494,194, dated March 28, 1893.

Application filed July 22, 1892. Serial No. 440,951. (No model.)

*To all whom it may concern:*

Be it known that I, HENRY R. FAY, a citizen of the United States, residing at Boston, in the county of Suffolk and State of Massachusetts, have invented a new and useful Engine-Valve, of which the following is a specification.

My invention relates to engine valves for engines, especially of the locomotive class, such as the ordinary locomotive engines, and cross compound engines.

It has for its object, when applied to the ordinary locomotive engine, the releasing of compression within the cylinder, and when applied to a cross compound engine, with the crank pins set at right angles (as is usual in an engine of this class) the controlling of a positive point of admitting a predetermined quantity of steam through the high pressure cylinder into the receiver and low pressure cylinder. These advantageous results are effectively accomplished in a simple manner.

In the use of this invention upon high pressure locomotive cylinders, the amount of compression release is controlled by the design of the valve and the location and size of the extra ports in the valve and cylinder. By the releasing of compression within the cylinders, especially at short points of cut-off, the efficiency of the locomotive will be increased, especially as to its speed and ease of running at high speed.

In the use of this invention, the valve, especially when at its full travel, upon the high pressure cylinder of a cross compound engine; the point of steam admission, and the amount of steam admitted, through the high pressure cylinder into the receiver and low pressure cylinder, is determined and controlled by the design of the valve and the location and size of the extra ports. By admitting a predetermined amount of steam, into the low pressure cylinder at a period when the low pressure piston is at or near the beginning of its stroke, the pounding of the low pressure side of the engine will be diminished, thereby increasing the efficiency and ease of running of the engine.

Figure 4:
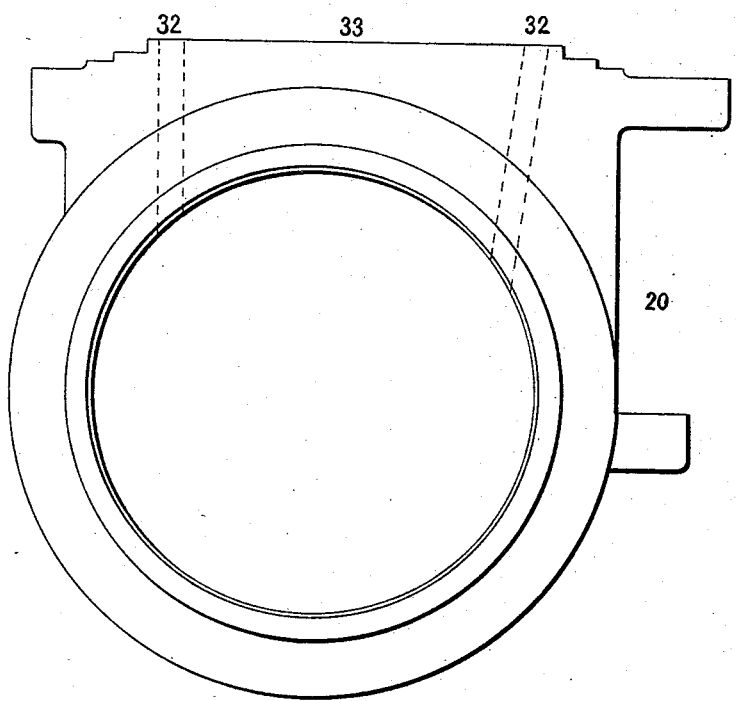
Figure 6:
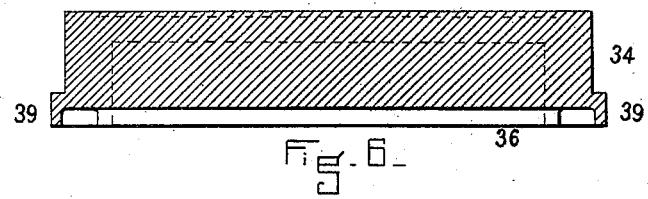
Figure 7:
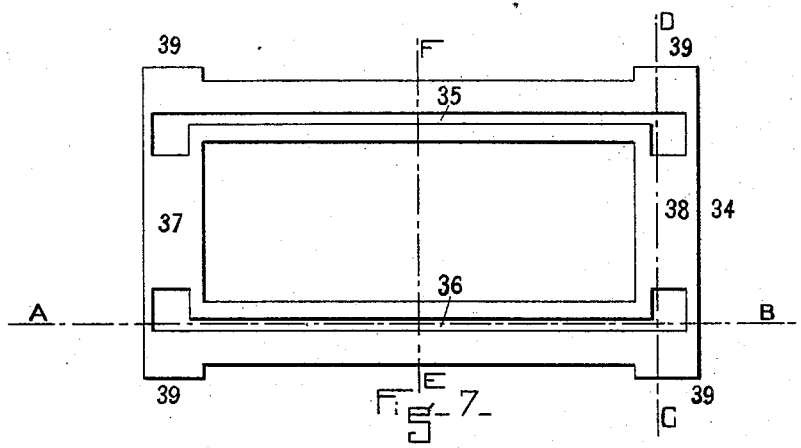
Figure 8:
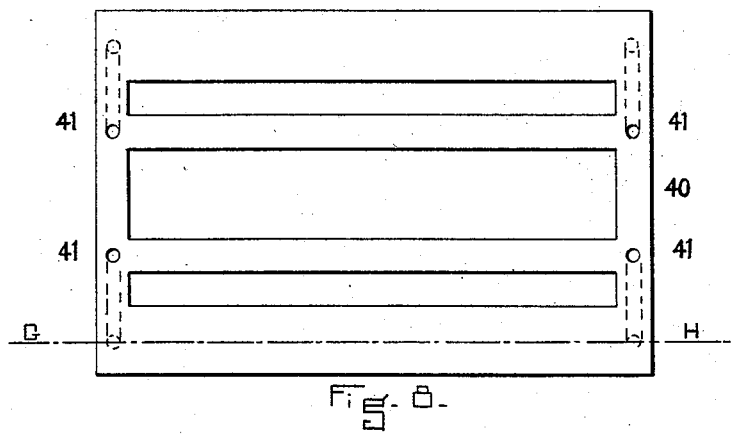
Figure 10:
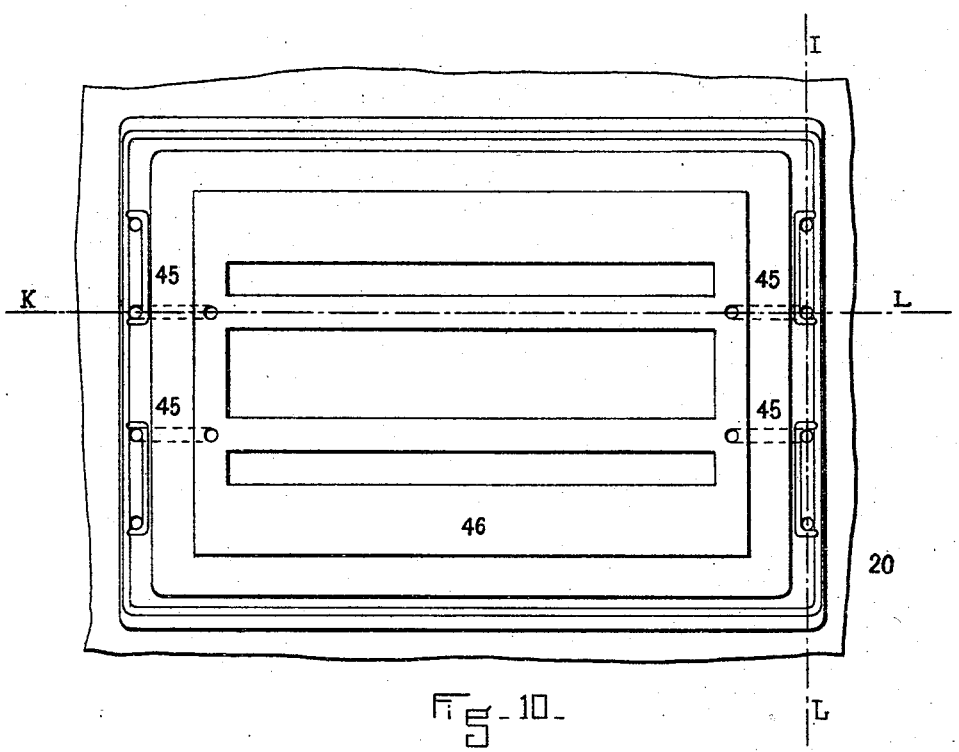
Figure 11:
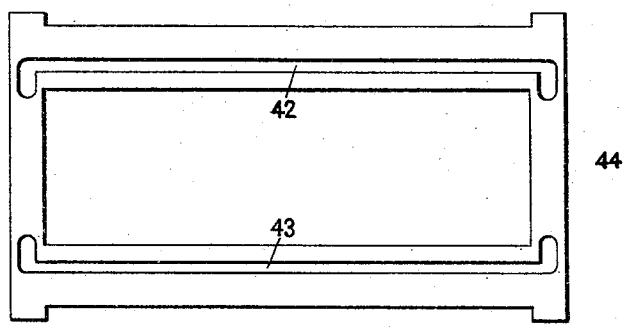
Figure 12:
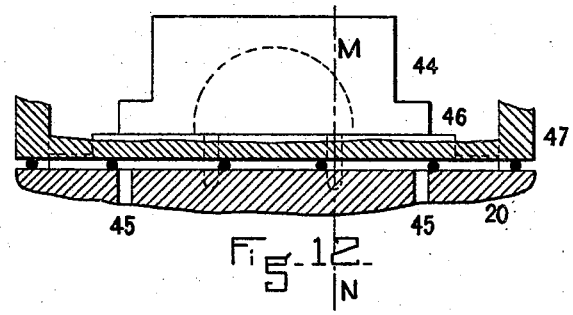
Figure 13:
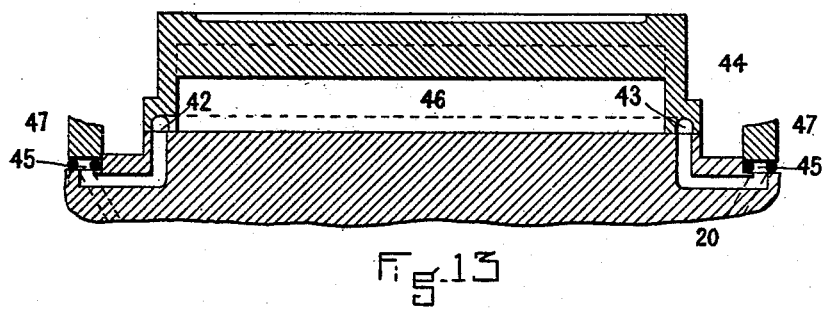
Figure 14:
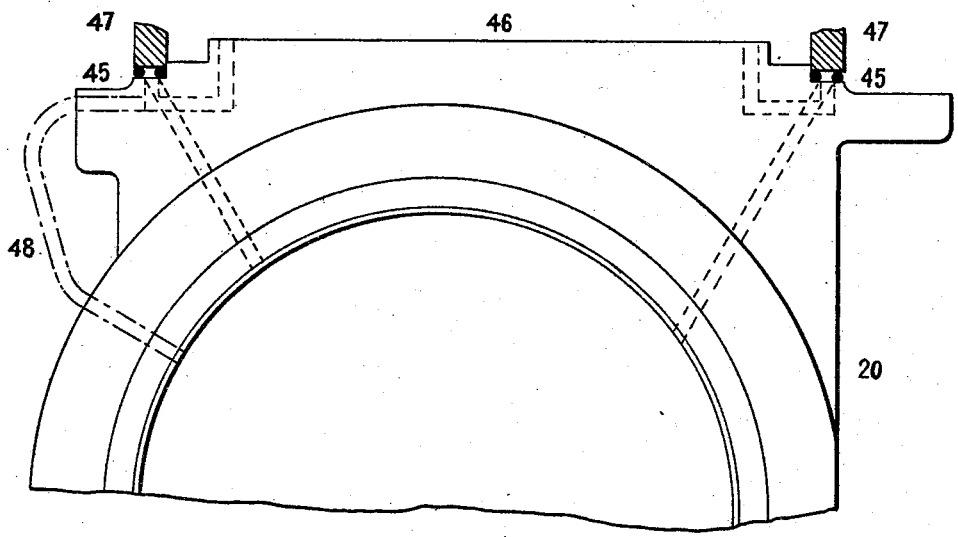

Figure 1 represents the upper half of an ordinary locomotive cylinder in longitudinal section. The valve is shown in section, on line C D of Fig. 7. The extra ports and valve being designed for a high speed passenger locomotive; the piston and valve are shown in their correct relative position, at or just before the point of release, the direction of travel, of both piston and valve, being indicated by arrows. In this view, the extra ports extending from the valve seat to the cylinder bore are shown as passing through the vertical center of the cylinder; but these ports actually extend down through the sides of the valve seat and cylinder as correctly represented in Figs. 3 and 4. Fig. 2 is a sectional view, similar to Fig. 1, except that the front half of the valve, is shown in section C. D. of Fig. 7, and the back half, in section E. F. of Fig. 7 and except also, that the piston and valve are represented in their correct relative position, immediately after the point of release, the direction of travel of both valve and piston are indicated by arrows. This view shows, by means of the arrows, the path of the released compression. Fig. 3 is a full plan view of Fig. 1, the steam chest cover and valve being removed and the walls of the steam chest are shown in section. In this view the extra ports are shown in the valve seat. Fig. 4 is an end view of the cylinder with the front head removed, showing in dotted lines, the extra ports, which extend from the valve seat to the bore of the cylinder. Fig. 5 is a central longitudinal full section of the valve and of the valve seat showing ports and extra ports, upon an enlarged scale. Fig. 6 shows the valve in inverted plan, upon an enlarged scale. Fig. 7 is a sectional view on line A. B. of Fig. 7. Fig. 8 illustrates the construction of a false valve seat, showing the manner of constructing the extra ports in applying my invention to an ordinary cylinder having a false valve seat, and Fig. 9 is a section of Fig. 8 on line G. H. Fig. 10 is a plan view of the valve seat of a locomotive cylinder of a common type showing the manner in which the extra ports may be made, to illustrate the method of applying my invention to cylinders already in use, and Fig. 11 is an inverted plan of a common D valve adapted for use upon the valve seat shown in Fig. 10, showing the extra valve ports. Fig. 12 is a sectional view of Fig. 10 on line I—J, the valve (Fig. 11) being shown in side elevation, and a portion of the steam chest is shown in section. Fig. 13 is a sectional view of Fig. 10 on line K. L. the sectional view of the valve being that on line M. N. of Fig. 12, and Fig. 14 is an end view of the upper portion of the cylinder the front head being removed, a small portion of the steam chest being shown. This view shows in dotted lines the extra ports, represented by Figs. 10—12 and 13, which extend (indirectly) from the valve seat to the bore of the cylinder. It also shows, on the left hand or outer side of the cylinder, by broken lines, an arrangement of piping, by means of which, the extra ports may extend through pipes around a portion of the cylinder, from the upper part of the cylinder to the bore of the cylinder. Fig. 15 is an inverted plan of the valve designed for use upon the high pressure cylinder of a cross compound engine. It is constructed same as the valve shown in Figs. 1, 2, 5, 6 and 7, except that it has a portion of its face cut away at the sides of the exhaust cavity, this exception or difference will be clearly manifest by comparing this valve with the valve shown by Fig. 7, and Fig. 16 is a sectional view, similar to Fig. 1, of the high pressure cylinder of a cross compound locomotive engine. The construction and arrangement of the extra ports is the same as shown by Figs. 1, 2, 3, 4, and 5, and the valve is shown in section, the front half of the valve is a section on line O—P. of Fig. 15, and the back half is a section on line Q. R. of Fig. 15, and the direction of travel of both valves and piston is indicated by arrows. The piston and valve are located in their approximately correct relative positions, on the longest travel of the valve. The path of steam admission from the steam chest to the exhaust is indicated by arrows. It is well known that, in cross compound engines, the exhaust of the high pressure cylinder is connected with the receiver and low pressure cylinder, which are not shown in the drawings.

The locomotive cylinder 20, shown in Figs. 1, 2, 3, 4, 5, 10, 12, 13, 14 and 16 is of an ordinary type and it is provided with the following, all of which are of the usual construction and arrangement:—Front head 21; back head 22, provided with the usual stuffing box; piston 23; piston rod 24; steam chest 25, provided with a common stuffing box; steam chest cover 26; valve rod 27; steam admission ports 28, and 29; and steam exhaust port 30.

The extra cylinder ports 31 and 32, which extend from the valve seat 33 to the bore of the cylinder, may be constructed and arranged as shown in Figs 1, 2, 3, 4, 5 and 16. These ports, starting from a point between the admission and exhaust port, the entering point of the ports into the bore of the cylinder may be varied to suit the conditions under which the locomotive is designed to run. So also, for the same reason may the size of the ports be varied, and they may be located on one side of the cylinder only.

The valve 34, represented in Figs. 1, 2, 5, 6 and 7, which is like an ordinary D valve, except in respect to the extra valve ports 35 and 36, which are constructed and arranged as follows: Both ports are alike, and each port is made within the valve face, the recessed rectangular openings in each side of the valve are connected together by means of a groove as shown in the drawings. It will be observed, referring especially to Figs. 1, 2 and 7, that the sides of the valve 37 and 38, extend between and are wider than the rectangular openings of the extra valve ports. This is for the purpose of preventing the passage of steam into the exhaust port, from the cylinder, through the extra cylinder and the valve ports. For the purpose of preventing the uncovering of the extra cylinder ports to the stem pressure within the steam chest, at the full travel of the valve, the lugs 39 are added to the valve.

The operation of the invention, referring to Figs. 1 and 2, is as follows: In Fig. 1, the piston and valve are represented in their approximately correct positions, at or just before the point of release, on the short point of cut-off of the valve, the travel of piston and valve being indicated by arrows. In Fig. 2, the piston and valve are represented in their correct relative position, just after passing the point of release, and just after the commencement of compression, between the piston and front cylinder head, and, as indicated by arrows, the compression is released from the cylinder and steam admission port 29, through the extra valve port 36 and extra cylinder port 32 into the cylinder from which the released compression passes to the exhaust port through the admission port 28. It is evident, that both ends of the cylinder and valve being alike, the release of compression will be accomplished at each stroke of the piston.

In a new cylinder, the extra cylinder ports may be readily made in the cylinder casting; but, when it is desired to apply my invention to a cylinder having a false valve seat, the extra cylinder ports, in the false seat, may be made as shown by Figs. 8 and 9, as follows:— The false seat 40, of regular construction, is provided with the four like extra cylinder ports 41, each of which is made by drilling and grooving the seat as shown by Figs. 8 and 9, the length of the groove is sufficient to extend directly over the point of entrance of the port into the cylinder, upon which the false valve seat may be placed.

In the application of my invention to locomotive cylinders, such as are in common use, the extra cylinder ports and extra valve ports may be constructed as shown by Figs. 10, 11, 12, 13 and 14. The extra valve ports 42 and 43 of the valve 44 are made same as in valve represented in Figs. 1, 2, 5, 6 and 7, except, that as the extra cylinder ports are round in section, the recessed openings forming the ends of the extra valve ports are semi-oblong in form, instead of being rectangular. In the cylinder, the extra valve ports 45 are made by drilling holes using a common drill and afterward plugging such a portion of each of the holes as may not be of use in the making of each port. Each port 45 commences on the valve seat 46, then down, out, and up to a space (which forms a portion of the port) directly under the wall of the steam chest 47 and between the copper gasket wires which are formed into rectangular shape at this point, and then downward into the bore of the cylinder. On the outer side of the cylinder 20, each extra cylinder port may be carried around a portion of the cylinder, if desired, by means of the pipe 48, as shown by broken lines in Fig. 14.

The application of my invention to the high pressure cylinder of a cross compound engine is illustrated by Figs. 15 and 16. In these figures the cylinder 20 is the same and the extra cylinder ports 31 and 32 are the same, as shown in Figs. 1, 2, 3, 4 and 5 and the valve 34' and the extra valve ports 35' and 36' are constructed same as shown by Figs. 1, 2, 5, 6 and 7, the only difference between the valve 34' and the valve 34, is that the valve 34' has its sides 37' and 38' cut back, as shown in Fig. 15, opposite the exhaust cavity, this is for the purpose of permitting the passage of the steam from the steam chest, through the admission port, a part of the cylinder, and the extra cylinder port 32' into the exhaust port, from which port the steam may pass into the receiver and low pressure cylinder, which are not shown. The path of the steam from the steam chest to the exhaust cavity is indicated by arrows in Fig. 16. It is obvious, that, as both ends of the cylinder and valve are alike in their construction, so far as relates to the extra ports, the steam admission from the steam chest to the exhaust port will take place at each stroke of the engine, after the piston has passed the mouth of the last extra cylinder port, in the direction of its stroke, on the full or nearly full travel of the valve.

The construction and arrangement of the extra cylinder and valve ports of an engine should be such as will meet the requirements of the design of that engine, and the extra valve ports may be readily applied to so called Richardson valve, the Allen Richardson valve, and other slide valves by makin such slight changes in the size and location of the extra valve ports as may be necessary to accomplish the results sought to be obtained, as duly set forth. So also, may the inside and outside lap of the valve, relative not only to the steam admission and exhaust ports, but to the extra ports, be increased or diminished.

What I claim as new, and desire to secure by Letters Patent, is—

1. In an engine, the cylinder provided with the extra cylinder ports, in combination with the valve provided with the extra valve ports, by means of which, compression release is accomplished, substantially as specified.

2. In an engine, the cylinder provided with the extra cylinder ports, in combination with the valve provided with the extra valve ports, by means of which steam admission into the exhaust port may take place, substantially as specified and for the purposes set forth.

3. In an engine, the cylinder provided with the extra cylinder ports, in combination with the valve provided with the extra valve ports, by means of which, on the short points of cut-off of the valve, in which case the compression is excessive, compression release is accomplished, substantially as set forth.

4. In an engine, the cylinder provided with the extra cylinder ports, in combination with the valve provided with the extra valve ports, by means of which, on the long points of cut-off of the valve, steam admission into the exhaust port may take place, substantially as specified and for the purposes set forth.

5. In an engine, the cylinder provided with the extra cylinder ports 31 and 32, in combination with the valve 34 having the extra valve ports 35 and 36, by means of which, compression release may take place, the path of the travel being from the cylinder and admission port around the piston through the extra valve and cylinder ports into the other end of the cylinder, and from the cylinder through the admission port, and exhaust cavity, into the exhaust port, substantially as set forth.

6. In an engine, the cylinder provided with the extra cylinder ports 31 and 32, in combination with the valve 34' having the extra valve ports 35' and 36' by means of which steam admission from the steam chest into the exhaust port may take place, the path of the travel of the steam admission being from the steam chest into the cylinder, through the steam admission port into the cylinder and from the cylinder through the extra cylinder port into the exhaust cavity and port, substantially as set forth.

7. The combination of the cylinder 20, provided with the extra cylinder ports 31 and 32, with the valve 34 provided with the extra valve ports 35 and 36, and having the sides of the valve 37 and 38 of some considerable width, substantially as and for the purposes set forth.

8. The combination of the cylinder 20 provided with the extra cylinder ports 31 and 32, with the valve 34' provided with the extra valve ports 35' and 36' and having the sides of the valve 37' and 38' cut back, substantially as and for the purposes set forth.

In testimony whereof I have signed my name to this specification in the presence of two subscribing witnesses.

HENRY R. FAY.

Witnesses:
E. FRANK WOODBURY,
CHARLES L. ELLIS.